(12) United States Patent
Murayama et al.

(10) Patent No.: US 11,035,283 B2
(45) Date of Patent: Jun. 15, 2021

(54) CONTROL APPARATUS

(71) Applicant: DENSO CORPORATION, Kariya (JP)

(72) Inventors: Yuki Murayama, Kariya (JP); Ryozo Kayama, Kariya (JP); Yusuke Todo, Kariya (JP); Manabu Yoshidome, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/832,433

(22) Filed: Mar. 27, 2020

(65) Prior Publication Data

US 2020/0224575 A1    Jul. 16, 2020

Related U.S. Application Data

(63) Continuation of application No. PCT/JP2018/034454, filed on Sep. 18, 2018.

(30) Foreign Application Priority Data

Sep. 29, 2017    (JP) .............................. JP2017-190368

(51) Int. Cl.
     *F01N 11/00*      (2006.01)
     *C25B 1/04*      (2021.01)
     *G01N 27/40*      (2006.01)
     *G01N 27/41*      (2006.01)
     *G01N 27/406*      (2006.01)

(52) U.S. Cl.
     CPC .............. *F01N 11/007* (2013.01); *C25B 1/04* (2013.01); *F01N 11/002* (2013.01); *G01N 27/4067* (2013.01); *G01N 27/41* (2013.01); *F01N 2560/026* (2013.01); *Y02E 60/36* (2013.01)

(58) Field of Classification Search
     CPC ......... C25B 1/04; Y02E 60/36; F01N 11/002; F01N 11/007; F01N 2560/026; G01N 27/4067; G01N 27/41
     See application file for complete search history.

(56) References Cited

U.S. PATENT DOCUMENTS

2009/0084677 A1    4/2009   Kawase et al.
2017/0219513 A1*   8/2017   Kayama ................. G01N 27/41
2017/0219516 A1    8/2017   Toudou et al.

\* cited by examiner

*Primary Examiner* — Audrey K Bradley
(74) *Attorney, Agent, or Firm* — Nixon & Vanderhye PC

(57) ABSTRACT

A microcomputer includes a voltage application unit that selectively applies a normal voltage and a removal voltage higher than the normal voltage to a first cell of the exhaust gas sensor. The first cell is configured to remove, based on the removal voltage, oxygen in an exhaust gas from an internal combustion engine. The microcomputer includes an element temperature measurement unit that measures an element temperature parameter indicative of a temperature of the first cell. The microcomputer includes a termination determination unit that determines, based on the element temperature parameter, a termination time of terminating the application of the removal voltage to the first cell by the voltage application unit.

10 Claims, 13 Drawing Sheets

CONTROL APPARATUS

CROSS-REFERENCE TO RELATED APPLICATIONS

This application is a bypass continuation application of currently pending international application No. PCT/JP2018/034454 filed on Sep. 18, 2018 designating the United States of America, the entire disclosure of which is incorporated herein by reference. The internal application is based on and claims the benefit of priority from Japanese Patent Application Publication No. 2017-190368 filed on Sep. 29, 2017, the entire disclosure of which is incorporated herein by reference.

TECHNICAL FIELD

The present disclosure relates to a control apparatus for an exhaust gas sensor.

BACKGROUND

Early activation control is known for achieving early activation of an exhaust gas sensor by quickly removing oxygen occluded in a sensor electrode of the exhaust gas sensor.

SUMMARY

A control apparatus includes a voltage application unit, an element temperature measurement unit, and a termination determination unit. The voltage application unit selectively applies a normal voltage and a removal voltage higher than the normal voltage to a first cell that constitutes the exhaust gas sensor. The first cell is configured to remove, based on the removal voltage, oxygen in an exhaust gas from an internal combustion engine. The termination determination unit determines, based on an element temperature parameter, a termination time of terminating the application of the removal voltage to the first cell by the voltage application unit.

DESCRIPTION OF THE EMBODIMENTS

Viewpoint

The invention disclosed in JP 2016-70922A applies a removal voltage higher than a normal voltage during starting of an exhaust gas sensor. This causes water in an exhaust gas to be decomposed, generating hydrogen as a reducing gas. The generated hydrogen reduces oxides on a sensor electrode, thereby removing oxygen on the sensor electrode.

The invention disclosed in JP 2016-70922A performs the early activation control only for a predetermined duration that is required for reliable removal of oxygen occluded in the sensor electrode when the sensor electrode is located in the most severe ambient conditions.

Such conventional exhaust gas sensors are used to be located in various environments, and there are individual variations among these conventional exhaust gas sensors. These factors may cause the duration required for such a conventional exhaust gas sensor to perform the early activation control to vary. This may result in the early activation control being performed for an excessive duration.

The present disclosure seeks to provide control apparatuses for an exhaust gas sensor, each of which is capable of determining, based on the state of the exhaust gas sensor, an execution time of early activation control as short as possible.

According to an aspect of the present disclosure, there is a control apparatus for an exhaust gas sensor. The control apparatus includes a voltage application unit, an element temperature measurement unit, and a termination determination unit. The voltage application unit selectively applies a normal voltage and a removal voltage higher than the normal voltage to a first cell that constitutes the exhaust gas sensor. The first cell is configured to remove, based on the removal voltage, oxygen in an exhaust gas from an internal combustion engine. The element temperature measurement unit measures an element temperature parameter indicative of a temperature of the first cell. The termination determination unit determines, based on the element temperature parameter, a termination time of terminating the application of the removal voltage to the first cell by the voltage application unit.

The above configuration determines, based on the element temperature parameter, the termination time of terminating the application of the removal voltage to the first cell using a predetermined correlation between the temperature of the first cell constituting the exhaust gas sensor and the generation of hydrogen for removing oxygen. The above configuration therefore enables the early activation control to be performed for a minimum duration determined based on the state of the exhaust gas sensor.

EMBODIMENTS

From this viewpoint, an exemplary embodiment of the present disclosure will now be described with reference to the accompanying drawings. For ease of understanding the description, like reference signs are used for like components throughout the drawings wherever possible, and redundant descriptions thereof are omitted.

Figure 1:
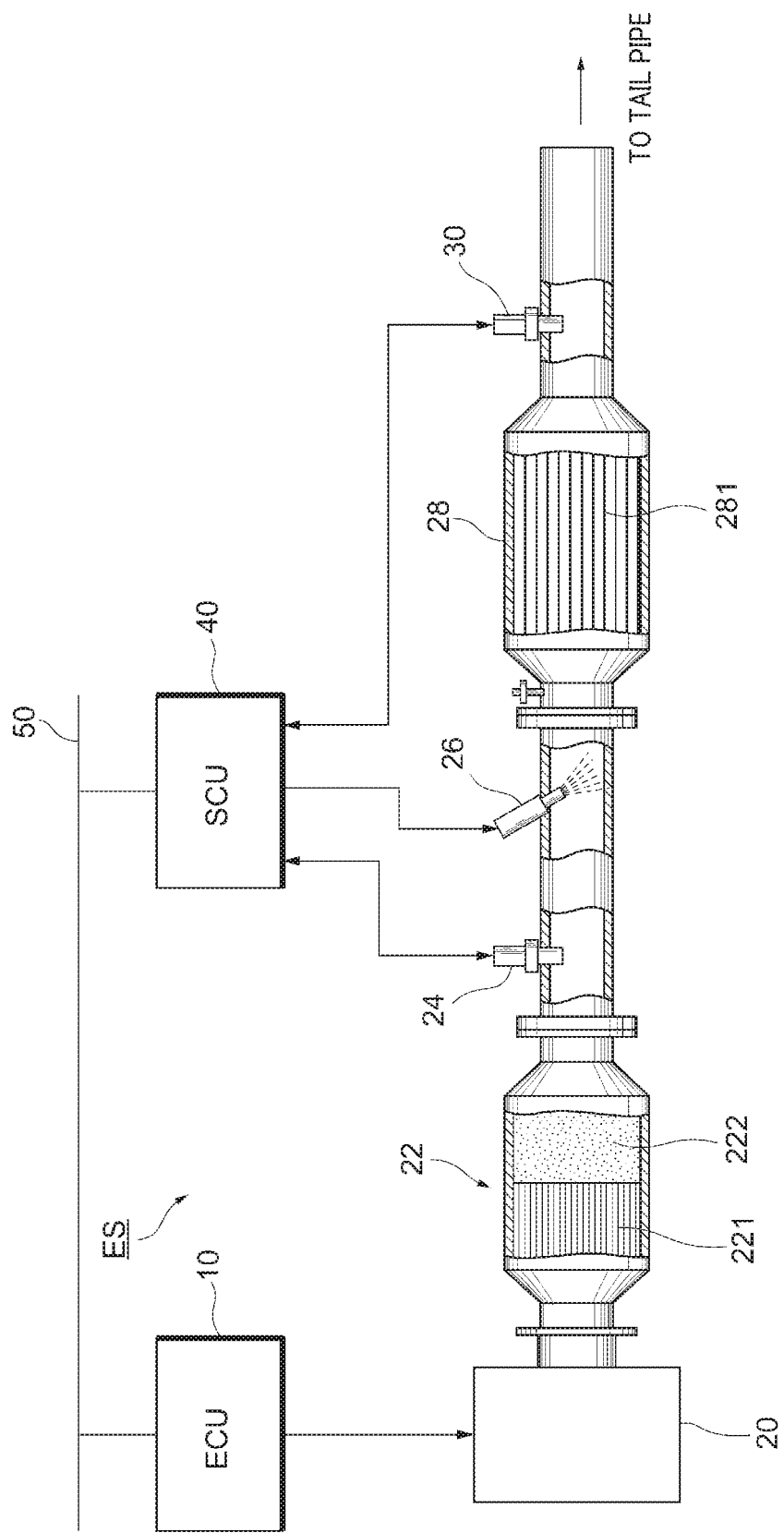
FIG. 1 is a diagram schematically illustrating an engine exhaust system.

FIG. 1 illustrates an engine exhaust system ES to which an engine control unit (ECU) 10 and a sensor control unit (SCU) 40 are connected. The ECU 10 is operative to control a diesel engine 20 and the engine exhaust system ES connected to the diesel engine 20.

Specifically, the ECU 10 has a function of controlling the behavior of the diesel engine 20, and a function of adjusting the degree of opening of a fuel injection valve of the diesel engine 20 based on the position of an accelerator pedal and the rotational speed of the diesel engine 20.

The engine exhaust system ES includes a diesel oxidation catalytic converter 22 and a selective catalytic reduction (SCR) converter 28 in this order from the diesel engine 20. The diesel oxidation catalytic converter 22 includes a diesel oxidation catalyst (DOC) 221 and a diesel particulate filter (DPF) 222.

The diesel oxidation catalytic converter 22 purifies an exhaust gas by oxidizing or reducing harmful substances contained in the exhaust gas. In particular, the diesel oxidation catalytic converter 22 captures particulate matters (PM) composed in particular of carbon and/or other materials.

The diesel oxidation catalyst 221 is composed principally of a ceramic carrier, a mixture of aluminum oxide, cerium dioxide, and zirconium dioxide, and a noble metal catalyst such as platinum, palladium, and/or rhodium. The diesel oxidation catalyst 221 purifies exhaust gas by catalytically oxidizing hydrocarbon, carbon monoxide, and nitrogen oxides (NOx) contained in the exhaust gas. The diesel oxidation catalyst 221 generates heat during the catalytic reaction thereof, increasing the temperature of the exhaust gas.

The diesel particulate filter 222 has a honeycomb structure comprised of a porous ceramic and a platinum catalyst such as platinum or palladium supported on the porous ceramic. The diesel particulate filter 222 allows particulate matters contained in the exhaust gas to accumulate on partition walls of the honeycomb structure. This enables the accumulated particulate matters to be oxidized so as to be burnt out. That is, the accumulated particulate matters are burnt out based on, for example, an increase in temperature of the diesel oxidation catalyst 221 and/or a decrease in temperature of the accumulated particulate matters due to an additive agent.

As an aftertreatment device for the diesel oxidation catalytic converter 22, the SCR catalytic converter 28 reduces NOx to nitrogen and water. The SCR catalytic converter 28 includes an SCR 281 which is a catalyst for selectively reducing NOx. One example of the SCR 281 may include a substrate, such as zeolite or alumina, and a precious metal such as Pt supported on the surface of the substrate. The SCR 281 reduces NOx to thereby purify the exhaust gas, when 1. The SCR 281 has a temperature sufficient to allow the SCR 281 to be active
2. Urea has been added to the exhaust gas Specifically, a urea addition injector 26 is provided upstream of the SCR converter 28, which aims to add urea to the exhaust gas.

In the present embodiment, a NOx sensor 24 is provided between the diesel oxidation catalytic converter 22 and the urea addition injector 26, and a NOx sensor 30 is provided downstream of the SCR catalytic converter 28.

The amount of urea added to the SCR catalytic converter 28 from the urea addition injector 26 is determined based on both the concentration of NOx measured by the NOx sensor 24 and the concentration of NOx measured by the NOx sensor 30.

More specifically, the NOx sensor 24 measures the concentration of NOx in exhaust gas that has not passed through the SCR catalytic converter 28, and the additive amount of urea is determined based on the measured concentration of NOx.

In addition, the NOx sensor 30 measures the concentration of NOx in exhaust gas that has passed through the SCR catalytic converter 28. This enables the additive amount of urea to be corrected to cause the measured NOx concentration fed back from the NOx sensor 30 to be minimized as low as possible. The amount of urea determined set forth above is configured to be added to the SCR 281 from the urea addition injector 26, thereby allowing the SCR 281 to appropriately reduce NOx in the exhaust gas. Having passed through the NOx sensor 24 and the NOx sensor 30, hydrocarbon, carbon monoxide, and a nitrogen oxide are discharged to the outside through a tail pipe (not shown) located at the end of the engine exhaust system ES.

The SCU 40 measures output currents from the NOx sensor 24 and the NOx sensor 30. The SCU 40 measures the amount of gas and performs an abnormal detection task for each of the sensors 24 and 30, and transmits necessary data to the ECU 10. The ECU 10 and SCU 40 are connected to a controller area network (CAN) bus 50, and communicate information to each other via the CAN bus 50.

The ECU 10 includes a processor such as a CPU, a RAM, a ROM, input/output ports, and a storage. The following description of the present embodiment focuses on a function of the SCU 40 to detect abnormality in an electrical system connected to the NOx sensor 24 and the NOx sensor 30. Since the NOx sensor 24 and the NOx sensor 30 have the same configuration, the configuration of the NOx sensor 24 will now be described.

Figure 2:
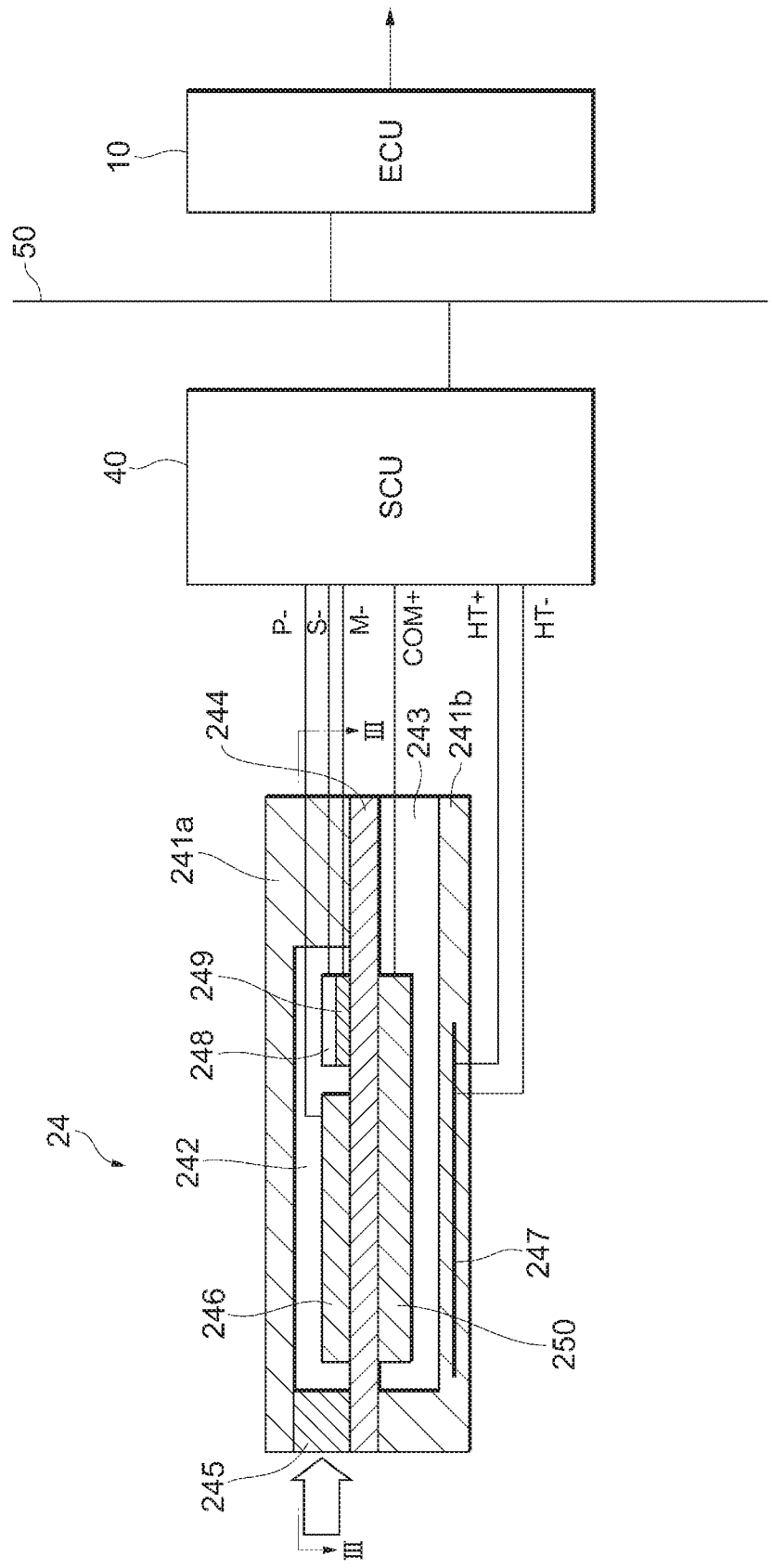
FIG. 2 is a diagram schematically illustrating the structure of a NOx sensor shown in FIG. 1.
Figure 3:
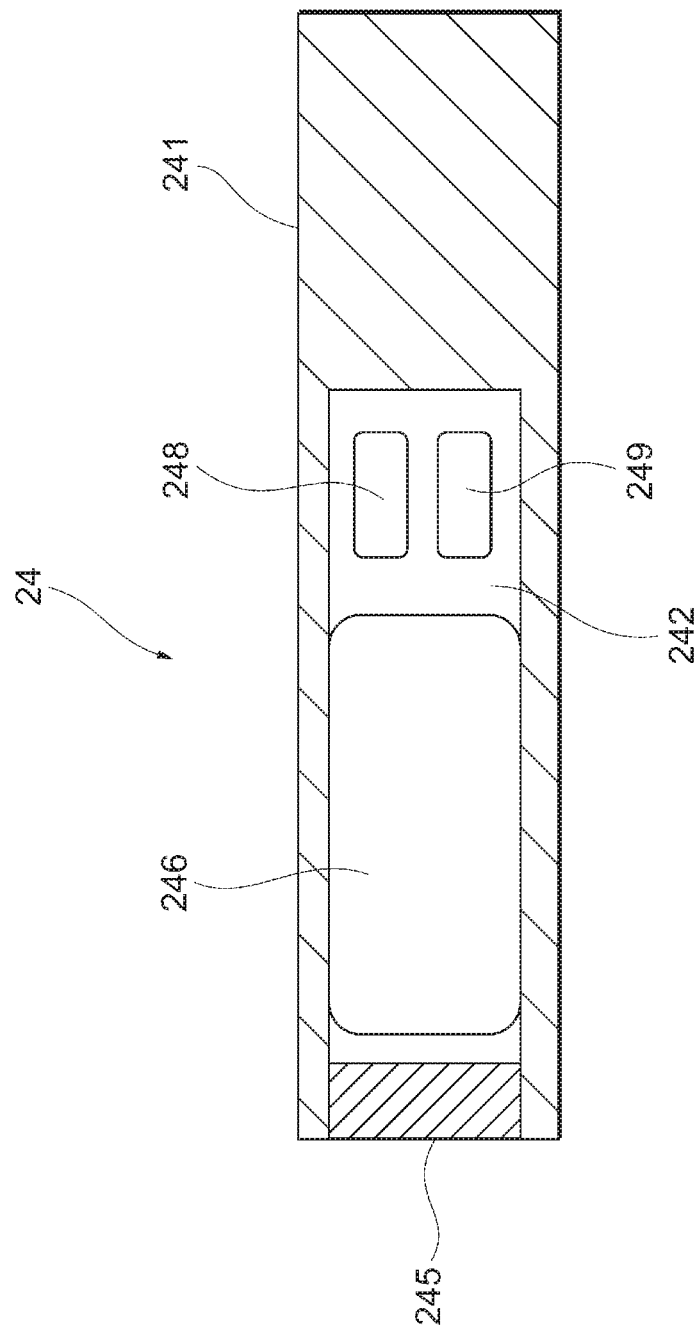
FIG. 3 is a cross-sectional view of the NOx sensor, taken along the line III-III of FIG. 2.

As illustrated in FIG. 2 and FIG. 3, the NOx sensor 24 includes a first body 241a, a second body 241b, a solid electrolyte 244, a diffusion resistor 245, a pump electrode 246, a heater 247, a sensor electrode 248, a monitor electrode 249, and a common electrode 250.

The solid electrolyte 244 is a plate-like member, and is composed of an oxide ion conductive solid electrolyte material such as zirconium oxide. The first body 241a and the second body 241b are each composed of an insulator that contains alumina as a major constituent, and are disposed with the solid electrolyte 244 therebetween.

The first body 241a has a chamber formed therein as a recess with respect to the solid electrolyte 244; the chamber serves as a measurement chamber 242. The measurement chamber 242 has one opening side in which the diffusion resistor 245 is disposed.

The diffusion resistor 245 is formed of a ceramic material such as porous alumina. The diffusion resistor 245 functions to regulate the flow rate of the exhaust gas drawn into the measurement chamber 242.

The second body 241b has a chamber formed therein as a recess with respect to the solid electrolyte 244; the chamber serves as an atmospheric chamber 243. The atmospheric chamber 243 has one opening side. This enables a gas drawn into the atmospheric chamber 243 via the solid electrolyte 244 to be discharged into the atmosphere.

The solid electrolyte 244 has opposing first and second surfaces. The first surface faces the measurement chamber 242, and the second surface faces the atmospheric chamber 243. The pump electrode 246 is disposed on the first surface of the solid electrolyte 244 to be adjacent to the diffusion resistor 245. The pump electrode 246 serves as a negative electrode. The pump electrode 246 is composed of a platinum-gold (Pt—Au) alloy.

The common electrode 250 is disposed on the second surface of the solid electrolyte 244 and positioned to face the pump electrode 246; the common electrode 250 serves as a positive electrode and is composed principally of platinum.

Applying a voltage between the pump electrode 46 and the common electrode 250 enables oxygen in the exhaust gas within the measurement chamber 242 to come into contact with the negative pump electrode 246, causing oxide ions to be generated.

These oxide ions flow through the solid electrolyte 244 toward the positive common electrode 250, releasing electrons to form oxygen at the common electrode 250. The generated oxygen is discharged from the atmospheric chamber 243 to the atmosphere. Thus, the pump electrode 246, the common electrode 250, and the solid electrolyte 244 between these two electrodes 246 and 250 provide a pump cell that functions to discharge oxide ions from the measurement chamber 242 to the atmospheric chamber 243.

The larger a voltage applied between the pump electrode 246 and the common electrode 250, the larger the amount of oxygen discharged through the pump cell from the exhaust gas to the atmosphere via the atmospheric air chamber 243. Conversely, the smaller a voltage applied between the pump electrode 246 and the common electrode 250, the smaller the amount of oxygen discharged through the pump cell from the exhaust gas to the atmosphere via the atmospheric chamber 243. Therefore, increasing or decreasing a voltage applied between the pump electrode 246 and the common electrode 250 enables an increase or decrease of the amount of oxygen remaining in the exhaust gas flowing to the sensor electrode 248 and the monitor electrode 249.

The monitor electrode 249 serving as a negative electrode is disposed on the first surface of the solid electrolyte 244 facing the measurement chamber 242. That is, the monitor electrode 249 is located on the opposite side of the pump electrode 246 from the diffusion resistor 245. The opposite side of the pump electrode 246 from the diffusion resistor 245 corresponds to the side closer to the rear side than the pump electrode 246 is. The common electrode 250 is disposed as the positive electrode for the monitor electrode 249 on the second surface of the solid electrolyte 244 facing the atmospheric chamber 243; a part of the common electrode 250 is positioned to face the monitor electrode 249. The monitor electrode 249, the common electrode 250, and the solid electrolyte 244 interposed between these two electrodes 249 and 250 provide a monitor cell that functions to measure the centration of oxygen.

The monitor cell measures the concentration of remaining oxygen in the exhaust gas from which oxygen has been discharged by the pump cell.

Applying a voltage between the monitor electrode 249 and the common electrode 250 enables remaining oxygen in the exhaust gas from which oxygen has been discharged by the pump cell to come into contact with the negative monitor electrode 249, causing oxide ions to be generated.

These oxide ions flow through the solid electrolyte 244 toward the positive common electrode 250, releasing electrons to become oxygen at the common electrode 250. The generated oxygen is discharged from the atmospheric chamber 243 to the atmosphere. The released electrons are detected as a monitor cell current Im by the monitor cell detection unit 404, and the concentration of remaining oxygen in the exhaust gas is calculated based on this monitor cell current Im.

The sensor electrode 248 serving as a negative electrode is disposed on the first surface of the solid electrolyte 244 facing the measurement chamber 242. That is, the sensor electrode 248 is located on the opposite side of the pump electrode 246 from the diffusion resistor 245. The common electrode 250 is disposed as the positive electrode for the sensor electrode 248 on the second surface of the solid electrolyte 244 facing the atmospheric chamber 243; a part of the common electrode 250 is positioned to face the sensor electrode 248. The sensor electrode 248, the common electrode 250, and the solid electrolyte 244 interposed these two electrodes 248 and 250 provide a sensor cell that calculates the concentration of NOx and residual oxygen in the exhaust gas.

The sensor electrode 248 is composed of a platinum-rhodium (Pt—Rh) alloy, and is highly effective in reducing NOx. NOx, which comes in contact with the sensor electrode 248, is reduced to $N_2$ and $O_2$.

Applying a voltage between the sensor electrode 248 and the common electrode 250 enables the $O_2$ to receive or accept electrons from the negative sensor electrode 248, causing oxide ions to be generated.

These oxide ions flow through the solid electrolyte 244 toward the positive common electrode 250, releasing electrons at the common electrode 250 to become oxygen, and the oxygen is discharged from the atmospheric chamber 243 to the atmosphere.

The amount of electrons released at the common electrode 250 is measured as a sensor cell current Is by the sensor cell detection unit 403, and the concentration of NOx and remaining oxygen in the exhaust gas is calculated based on this sensor cell current Is.

It is preferred to correct the effects of the pump cell in calculating the concentration of NOx, because the absolute volume of gas flowing into the measurement chamber 242 depends on the quantity of oxygen discharged by the pump cell.

The exhaust gas sensor may be configured to function as an air/fuel (A/F) ratio sensor, because the pump cell is capable of measuring an output signal indicative of the concentration of oxygen in the exhaust gas. The A/F ratio is preferably calculated based on a pump cell current Ip that flows between the pump electrode 246 and the common electrode 250. These gas-concentration measurements may be performed every cycle of 5 ms; this cycle can be suitable for the case of the NOx sensor 24 being used in vehicles.

The solid electrolyte 244 is required to be heated by the heater 247 to a predetermined temperature, because the gas-concentration measurements use the flow of oxide ions through the solid electrolyte 244. Since the NOx sensor 24 is not provided with a sensor that directly measures the temperature of the solid electrolyte 244, the temperature of the NOx sensor 24 is calculated based on at least one output current that flows through a corresponding at least one of the negative electrodes upon application of a predetermined voltage between the corresponding at least one of the negative electrodes and the positive common electrode 250. This is because the temperature of the solid electrolyte 244 correlates with its resistance.

Because the solid electrolyte 244 may have a capacitance component, it is preferred to remove the effects of the capacitance component of the solid electrolyte 244 in voltage application across the solid electrolyte 244. For this reason, it is preferable to use, as the application voltage across the solid electrolyte 244, a sweep voltage with a predetermined frequency, which is cyclically changing in a positive side and a negative side. Applying the sweep voltage across the solid electrolyte 244 enables a charge stored in the capacitor component based on a positive half cycle of the sweep voltage to be released based on a negative half cycle of the sweep voltage.

Applying the sweep voltage across the solid electrolyte 244 may cause an extra current caused by the sweep-voltage application to be superimposed on each output current indicative of the concentration of the corresponding gas; therefore, it is preferred not to measure the concentration of each gas during application of the sweep voltage or a predetermined period.

Applying the sweep voltage to the positive common electrode 250 enables, through each of the pump electrode 246, the sensor electrode 248, and monitor electrode 249, the corresponding output current. For this reason, it is possible to determine the temperature of the solid electrolyte 244 based on the output current through any one of the pump electrode 246, sensor electrode 248, and the monitor electrode 249.

It is preferred that the output current through each of, for example, the sensor electrode 248 and the monitor electrode 248 based on the sweep voltage is set to be higher than that therethrough during measurement of the corresponding gas concentration. It is also preferred to determine the temperature of the solid electrolyte 244 based on the output current through the pump electrode 246.

In order to prevent the solid electrolyte 244 from being damaged, the SCU 40, when activated, starts to perform a minute-current energization mode for the heater 247. The weak-current energization mode prevents the solid electrolyte 244 from being damaged due to 1. A sudden change in pressure inside the solid electrolyte 244 and/or
2. The solid electrolyte 244 being subjected to condensed water in a vehicular exhaust pipe After the start of the minute-current energization mode, in response to an energization request from the ECU 10, the SCU 40 causes the heater 247 to operate with a high duty cycle to thereby heat the solid electrolyte 244 up to a predetermined early-activation temperature at which the NOx sensor 24 is capable of measuring the concentration of each of the gases. The SCU 40 preferably has a function of interrupting energization of the heater 247 in response to the occurrence of damage to the solid electrolyte 244 or the occurrence of a fault in the NOx sensor 24, such as a wire break or a short-circuit in the circuit of the NOx sensor 24. In order to prevent the level of activation of the solid electrolyte 244 from changing due to a supply voltage for the SCU 40, it is preferred that the duty cycle of the heater 247 is varied based on a value of the supply voltage recognized by the SCU 40.

Figure 4:
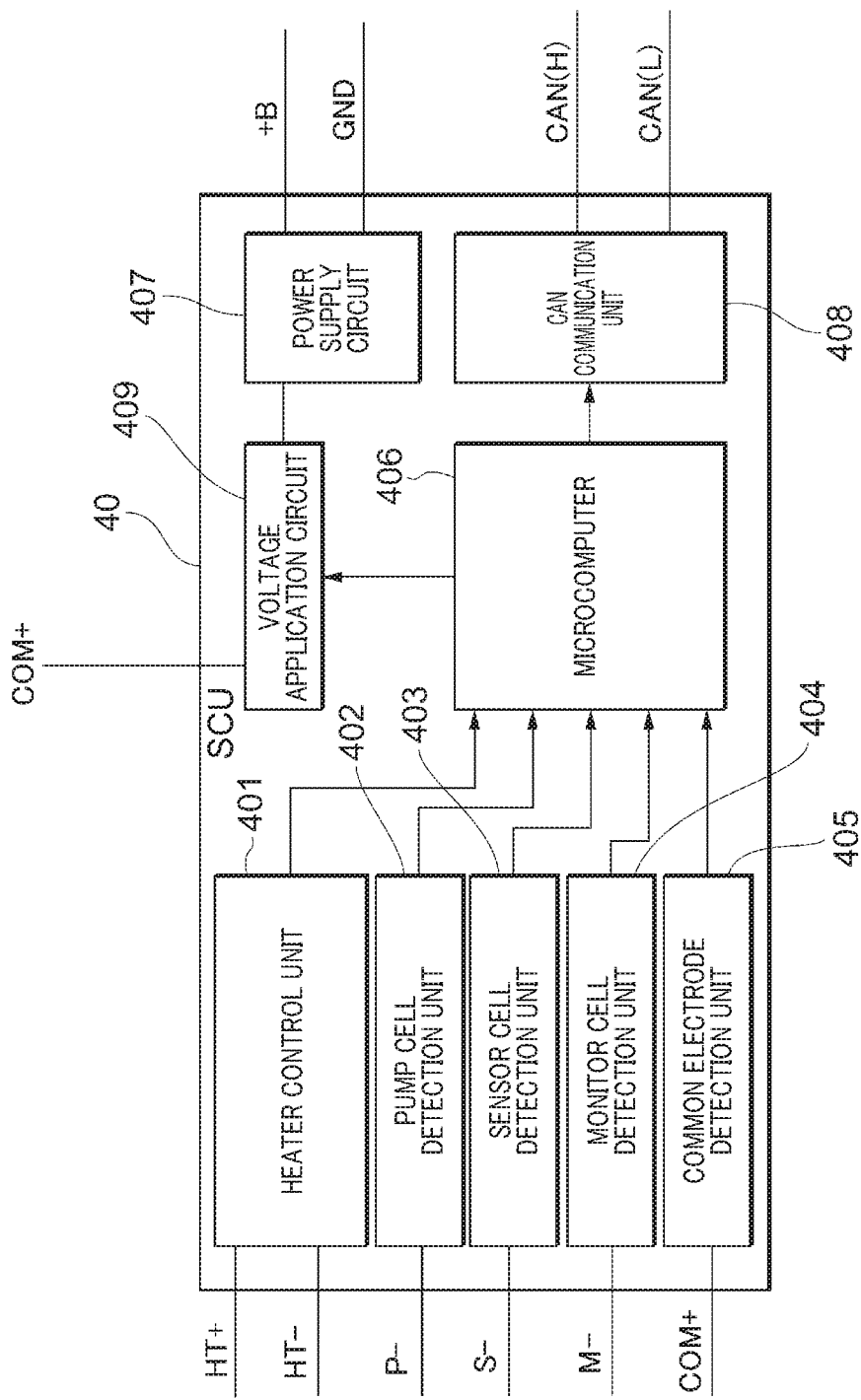
FIG. 4 is a block diagram illustrating the configuration of a sensor control unit (SCU) shown in FIG. 1.

The SCU 40 is partly or entirely constituted by an analog circuit or a digital processor including a memory. Whether the analog circuit or the digital processor, the SCU 40 includes functional components to perform a function of transmitting control signals based on received electronic signals. FIG. 4 is a block diagram illustrating the functional components of the SCU 40.

The functional components of the SCU 40 will now be described. The SCU 40 includes, as the functional components, a heater control unit 401, a pump cell detection unit 402, a sensor cell detection unit 403, a monitor cell detection unit 404, a common electrode detection unit 405, a microcomputer 406, a power supply circuit 407, a CAN communication unit 408, and a voltage application circuit 409.

The heater control unit 401 regulates a voltage applied to the heater 247 to control the amount of heat generated by the heater 247.

The pump cell detection unit 402 measures the pump cell current Ip that flows through the pump electrode 246. The pump cell detection unit 402 transmits, to the microcomputer 406, a signal indicating a measured value of the pump cell current Ip. The pump cell detection unit 402 is capable of measuring a pump cell voltage Vp across the pump cell. The pump cell detection unit 402 transmits, to the microcomputer 406, a signal indicating a measured value of the pump cell voltage Vp.

The sensor cell detection unit 403 measures the sensor cell current Is that flows through the sensor electrode 248. The sensor cell detection unit 403 transmits, to the microcomputer 406, a signal indicating a measured value of the sensor cell current Is.

The monitor cell detection unit 404 measures the monitor cell current Im that flows through the monitor electrode 249. The monitor cell detection unit 404 transmits, to the microcomputer 406, a signal indicating a measured value of the monitor cell current Im.

The common electrode detection unit 405 measures a common electrode current Icom that flows through the common electrode 250. The common electrode detection unit 405 transmits, to the microcomputer 406, a signal indicating a measured value of the common electrode current Icom. The common electrode detection unit 405 is capable of measuring a common electrode voltage Vcom at the common electrode 250. The common electrode detection unit 405 transmits, to the microcomputer 406, a signal indicating a measured value of the common electrode voltage Vcom.

The microcomputer 406 serves as a controller in the SCU 40. The microcomputer 406 transmits, to the heater control unit 401, a control signal for controlling the temperature of the heater 247. The microcomputer 406 calculates the concentration of NOx in the exhaust gas based on the sensor cell current Is measured by the sensor cell detection unit 403 and the monitor cell current Im measured by the monitor cell detection unit 404.

That is, the microcomputer 406 subtracts the monitor cell current Im, which is output from the monitor electrode 249, from the sensor cell current Is, which is output from the sensor electrode 248, to thereby exclude, from the sensor cell current Is, a current value based on the concentration of the remaining oxygen outputted from the sensor cell. This calculates the concentration of NOx in the exhaust gas. The microcomputer 406 transmits, to the CAN communication unit 408, a signal indicating the calculated concentration of NOx.

The power supply circuit 407 serves as a power source for the components of the SCU 40. The CAN communication unit 408 transmits, to the CAN bus 50, signals transmitted from the microcomputer 406, and transmits, to the microcomputer 406, signals received from the CAN bus 50.

The voltage application circuit 409 applies a voltage to, for example, each of the common electrode 250 and the pump electrode 246. The voltage application circuit 409 applies the sweep voltage whose level continuously varies to the common electrode 250. The voltage application circuit 409 is capable of applying a variable voltage to the pump electrode 246. The voltage application circuit 409 may be a composite circuit that has other measurement functions (e.g., current measurement or voltage measurement).

Figure 5:
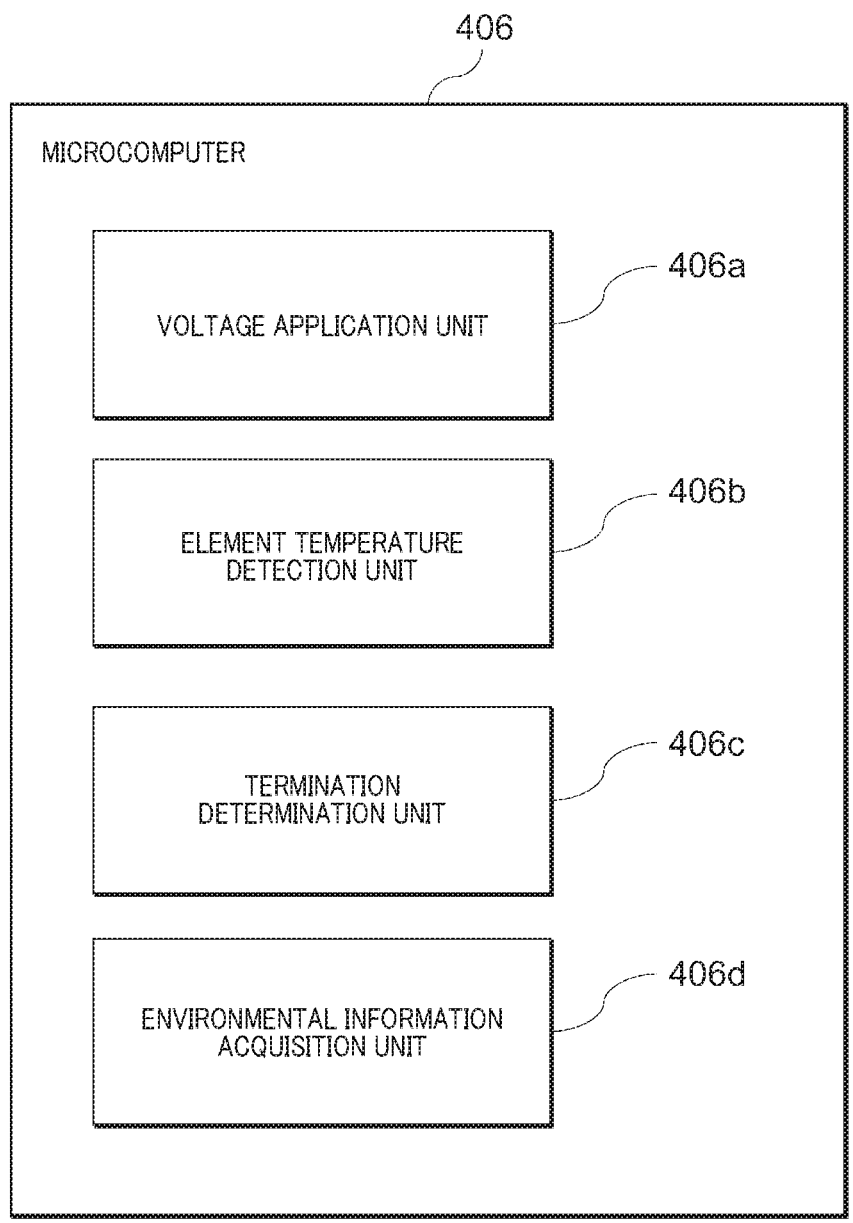
FIG. 5 is a block diagram illustrating functional components of a microcomputer shown in FIG. 4.

Functional components of the microcomputer 406 will now be described with reference to FIG. 5. The functional components of the microcomputer 406 include a voltage application unit 406a, an element temperature detection unit 406b, a termination determination unit 406c, and an environmental information acquisition unit 406d.

The voltage application unit 406a applies a normal voltage and a removal voltage higher than the normal voltage for removing oxygen, to the pump cell, which is a first cell for removing oxygen in the exhaust gas from the combustion engine.

The element temperature detection unit 406b measures an element temperature parameter indicating the temperature of the first cell.

The termination determination unit 406c determines a termination time of terminating application of the removal voltage by the voltage application unit 406a.

That is, because there is a predetermined correlation between the temperature of the first cell of the NOx sensor 24 and the generation of hydrogen for removing oxygen, the termination determination unit 406c uses the correlation to thereby determine the termination time as a function of the element temperature parameter. This configuration allows early activation control for the NOx sensor 24 to be performed for a minimum amount of time determined based on the state of the NOx sensor 24.

As the element temperature parameter, which indicates the temperature of the first cell, i.e. the pump cell, the admittance or impedance of the first cell measured during application of an alternating-current (AC) voltage across the first cell is preferably used.

The pump cell, which serves as the first cell, decomposes water contained in the exhaust gas to generate hydrogen as a reducing gas for removing oxygen in the exhaust gas from the internal combustion engine. This function provides that there is a close correlation between the temperature of the pump cell and the generation of hydrogen for removing oxygen. This therefore enables the termination determination unit 406c to more appropriately determine the termination time of terminating the application of the removal voltage.

As the element temperature parameter, which indicates the temperature of the second cell, i.e. the sensor cell and/or monitor cell, the admittance or impedance of the second cell measured during application of an AC voltage across the first cell is preferably used; the second cell is used for detecting a target component contained in a measurement target gas from which oxygen has been removed by the pump cell, i.e. the first cell.

Even if the oxygen is generated as the reducing gas, no reductive reaction between the oxygen and hydrogen that is the reducing gas is generated until the second cell, i.e. the sensor cell and/or the monitor cell, which serves as a target for reduction, has risen up to a predetermined sufficient temperature. For this reason, determining the termination based on the temperature of the sensor cell and/or the monitor cell enables the early activation control to be performed according to the reduction condition of the sensor cell and/or the monitor cell.

As the element temperature parameter, which indicates the temperature of each of the first cell, i.e. the pump cell, and the second cell, the admittance or impedance of the second cell measured during application of an AC voltage across the first cell is preferably used; the second cell, which is the sensor cell or monitor cell, is used for detecting the target component contained in the measurement target gas from which oxygen has been removed by the pump cell, i.e. the first cell.

Since the above configuration checks both the temperature state of the pump cell serving as the first cell, which generates hydrogen as the reducing gas, and the temperature state of the pump cell, serving as the second cell, it is possible to determine the termination time more reliably and appropriately.

The termination determination unit 406c is capable of determining that it is the termination time to terminate application of the removal voltage by the voltage application unit 406a in response to when a predetermined threshold period has elapsed since the element temperature parameter reached a value corresponding to a predetermined threshold temperature.

The predetermined threshold temperature is set to a temperature at which the pump cell, i.e. the first cell, is capable of decomposing water. Determining that the element temperature parameter has reached the value corresponding to the predetermined threshold temperature enables the pump cell to reliably generate hydrogen. The predetermined threshold period is set to a necessary reduction duration or a necessary duration that is required for a predetermined reduction target part of the exhaust gas sensor to be reduced after hydrogen is supplied from the pump cell as the reducing gas. This allows the reduction target part to be reduced reliably.

The termination determination unit 406c is capable of adjusting the length of the predetermined threshold period based on an elapsed period that has elapsed from the time at which the removal voltage was started to be applied to the pump cell, i.e. the first cell, until the element temperature parameter has arrived at the predetermined threshold temperature.

The elapsed period represents the period that has elapsed from the time at which the voltage application unit 406a started to apply the removal voltage to the arrival time at which the element temperature parameter has arrived at the predetermined threshold temperature. The elapsed period therefore indicates the rate of increase in the temperature of the NOx sensor 24, i.e. the exhaust gas sensor. In other words, the elapsed period indicates the level of ease in reduction of the reduction target part of the NOx sensor 24.

Determining the predetermined threshold period based on the elapsed period required for the element temperature parameter to have reached the predetermined threshold temperature enables a duration for which the removal voltage is maintained to be optimized.

The termination determination unit 406c is capable of adjusting the predetermined threshold period so that the longer the elapsed period, the longer the predetermined threshold period.

The longer the elapsed period from application of the removal voltage by the voltage application unit 406a to the arrival time at which the element temperature parameter has reached the predetermined threshold temperature, the less the ease in reduction of the reduction target part of the NOx sensor 24, i.e. the exhaust gas sensor. Setting the predetermined threshold period for which the removal voltage is maintained to be longer enables the reduction target part to be more reliably reduced.

The environmental information acquisition unit 406d acquires at least one of 1. Information on environmental conditions including at least one of the flow rate of the exhaust gas and the temperature of the exhaust gas in the predetermined portion of the engine exhaust system ES where the NOx sensor 24, i.e. the exhaust gas sensor, is disposed 2. Information on operating conditions of the internal combustion engine The function of the environmental information acquisition unit 406d may be implemented on the ECU 10. In this case, the environmental information acquisition unit 406d can receive information on the termination timing of the early activation control and/or information on a necessary reduction time. The environmental information acquisition unit 406d is capable of adjusting the predetermined threshold period based on the environmental conditions and/or the operating conditions.

The environmental conditions and/or the operating conditions vary the rate of increase in the temperature of the NOx sensor 24, i.e. the exhaust gas sensor. From this viewpoint, determining the predetermined threshold period based on the environmental conditions and/or the operating conditions enables the removal voltage to be maintained for an optimum duration.

Based on the environmental conditions, the termination determination unit 406c is capable of adjusting the predetermined threshold period such that, the higher the flow rate and the lower the temperature of the exhaust gas in the predetermined portion of the engine exhaust system ES, the longer the predetermined threshold period.

That is, the higher the flow rate and the lower the temperature of the exhaust gas in the predetermined portion of the engine exhaust system ES, the lower the level of ease in the reduction of the reduction target part of the NOx sensor 24. For this reason, setting the predetermined threshold period for which the removal voltage is maintained to be longer enables the reduction target part to be more reliably reduced.

Based on the operating conditions, the termination determination unit 406c is capable of adjusting the predetermined threshold period so that the higher at least one load on the internal combustion engine and the higher the rotational speed thereof, the longer the predetermined threshold period.

The higher at least one load on the internal combustion engine and the higher the rotational speed thereof, the lower the level of ease in the reduction of the reduction target part of the NOx sensor 24. For this reason, setting the predetermined threshold period for which the removal voltage is maintained to be longer enables the reduction target part to be more reliably reduced.

In the present embodiment, the cells of the NOx sensor 24, i.e. the exhaust gas sensor, are all arranged in the measurement chamber 242.

This arrangement of all the cells of the NOx sensor 24 enables the length of time required for sufficient reduction of the reduction target part to be shorter than in the case where the cells of the exhaust gas sensor are respectively disposed in different chambers.

Figure 6:
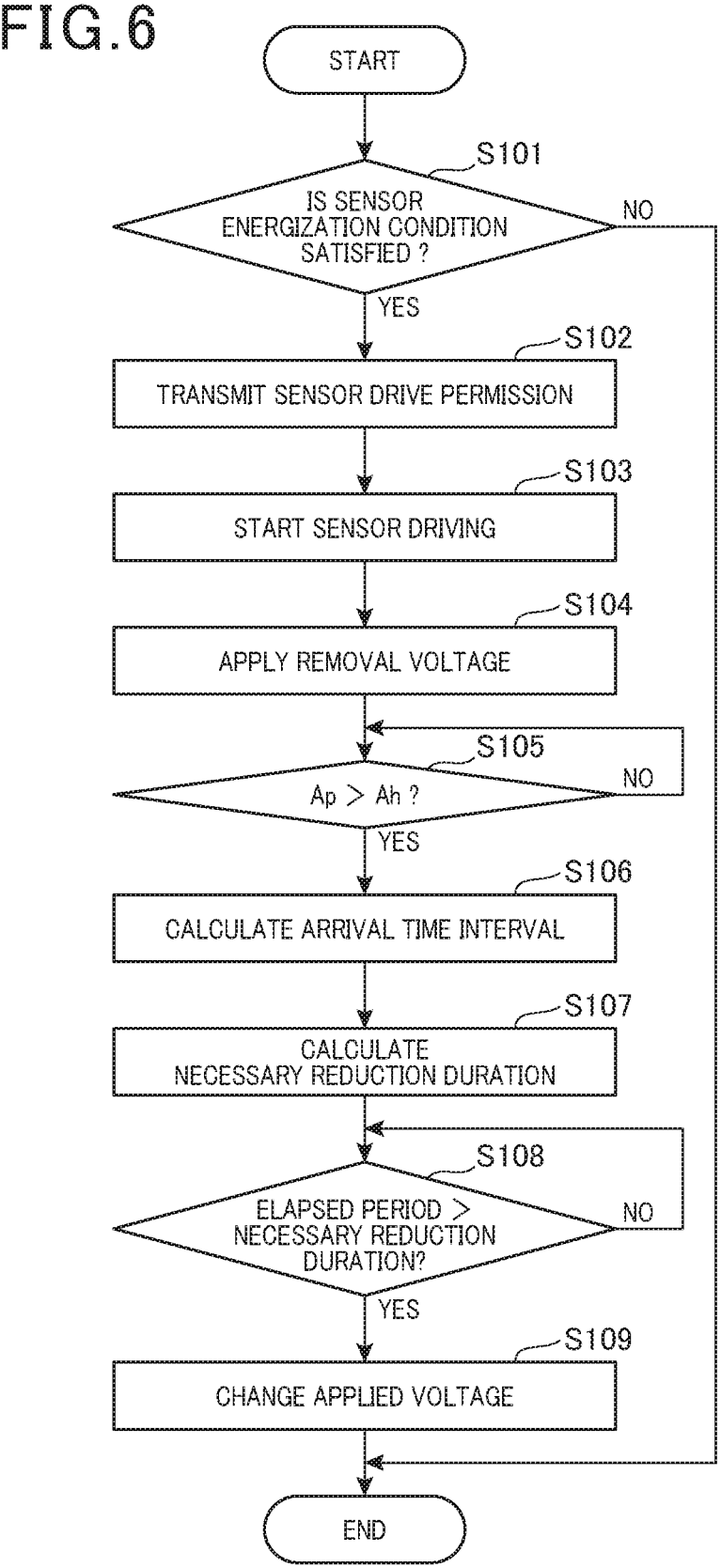
FIG. 6 is a flowchart illustrating a routine performed by an engine control unit (ECU) and the SCU shown in FIG. 1.

Next, a routine performed by the ECU 10 and the SCU 40 will now be described with reference to the flowchart of FIG. 6.

At step S101, the ECU 10 determines whether a sensor energization condition is satisfied. The sensor energization condition is satisfied if the condition of the NOx sensor 24, i.e. the exhaust gas sensor, satisfies predetermined one or more dry conditions. If the sensor energization condition is satisfied (YES at step S101), the routine proceeds to step S102. Otherwise, if the sensor energization condition is not satisfied (NO at step S101), the routine is terminated.

Figure 7:
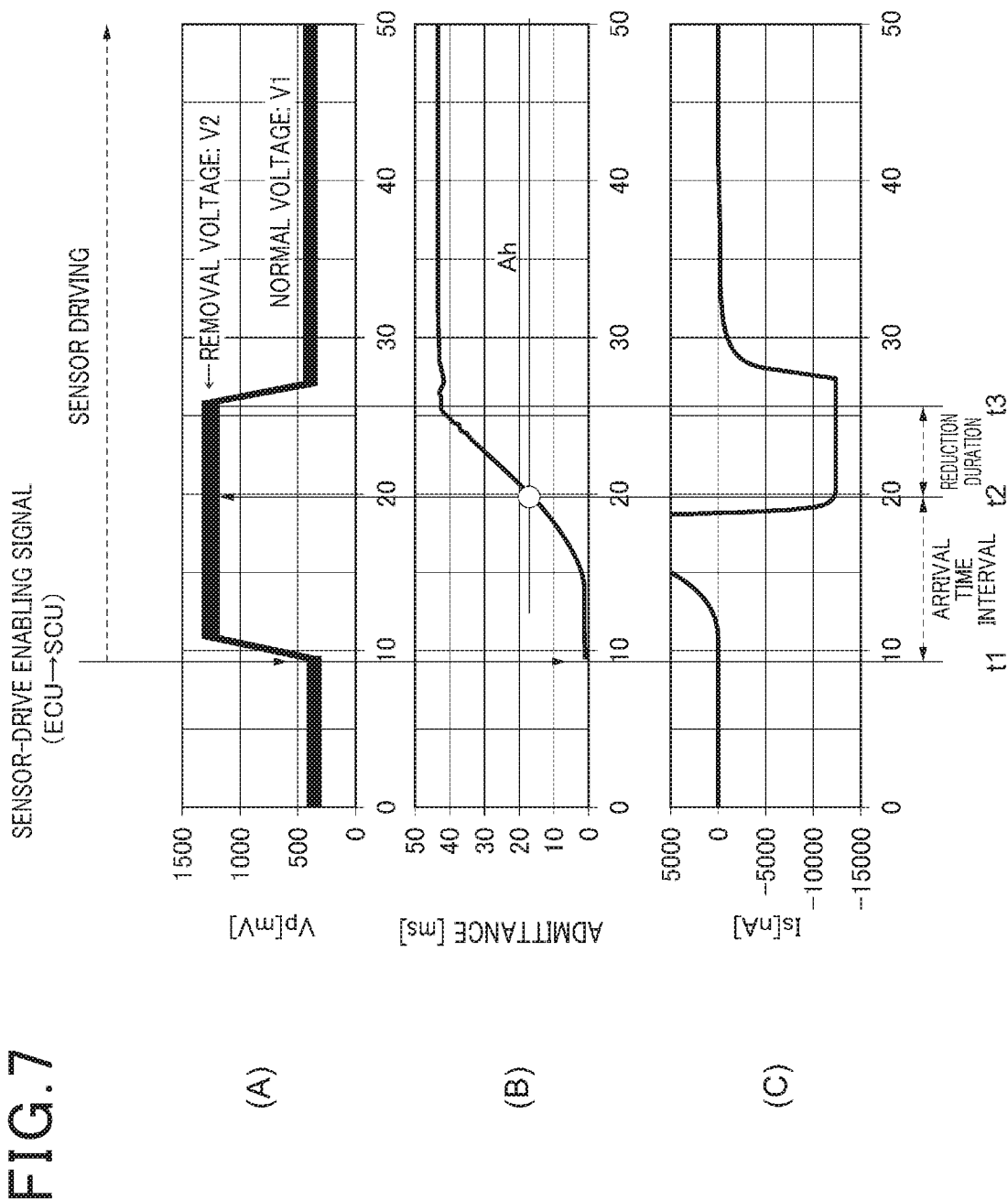
FIG. 7 is a flowchart illustrating the routine performed by the ECU and the SCU shown in FIG. 1.

At step S102, the ECU 10 transmits a sensor-drive enabling signal indicative of a sensor-drive permission to the SCU 40. At step S103 following step S102, the SCU 40 energizes the NOx sensor 24 in response to the sensor-drive enabling signal to thereby start driving the NOx sensor 24. The operation at step S103 is executed at time t1 of FIG. 7. Reference character (A) in FIG. 7 illustrates a voltage applied to the pump cell, while reference character (B) of FIG. 7 illustrates the admittance of the pump cell.

While a periodic AC voltage $\Delta Vp$ is applied to the pump cell, it is possible to measure a current $\Delta Ip$ flowing through the pump cell, and to calculate the impedance of the pump cell based on the measured current $\Delta Ip$, thus calculating the admittance Ap as the reciprocal of the calculated impedance. Reference character (C) of FIG. 7 illustrates a detected current flowing through the sensor cell based on the application of the AC voltage $\Delta Vp$.

At step S104 following step S103, the voltage application unit 406a applies a removal voltage V2 as, for example, a part of the AC voltage $\Delta Vp$ to the pump cell to thereby start the early activation control. As shown in reference character (A) of FIG. 7, the removal voltage V2 is set to be higher than a normal voltage V1.

At step S105 following step S104, the element temperature detection unit 406b measures a pump cell admittance Ap while the removal voltage V2 is applied to the pump cell. Then, the termination determination unit 406c determines whether the pump cell admittance Ap is greater than a predetermined hydrogen generation admittance Ah.

If the pump cell admittance Ap is less than or equal to the hydrogen generation admittance Ah (NO at step S105), the determination at step S105 is repeatedly executed.

Otherwise, if the pump cell admittance Ap is greater than the hydrogen generation admittance Ah (YES at step S105), the routine proceeds to step S106.

At step S106, the termination determination unit 406c calculates an arrival time interval that has elapsed from the start of driving the sensor 24 at the time t1 of FIG. 7 to the arrival time at which the pump cell admittance Ap has arrived at the hydrogen generation admittance Ah at time t2 of FIG. 7.

Figure 8:
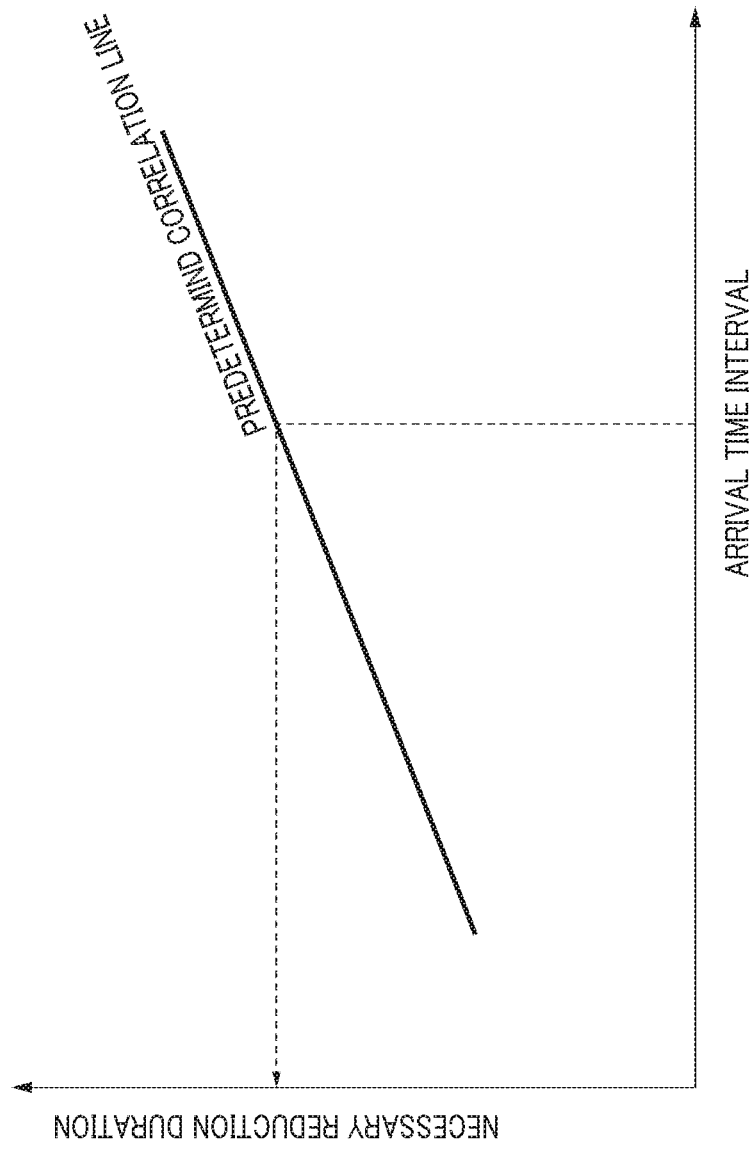
FIG. 8 is a graph used for describing the routine performed by the SCU of FIG. 1.

At step S107 following step S106, the termination determination unit 406c calculates a necessary reduction duration as the predetermined threshold period. One example of FIG. 8 shows that the necessary reduction duration and the arrival time interval have a predetermined relationship, i.e. correlation, therebetween; the arrival time interval represents a time interval that that has elapsed from the start of driving the sensor 24 at the time t1 of FIG. 7 to the arrival time when the pump cell admittance Ap has arrived at the hydrogen generation admittance Ah at time t2 of FIG. 7.

Based on this relationship, the termination determination unit 406c calculates a value of the necessary reduction duration in accordance with a calculated value of the arrival time interval.

At step S108 following S107, the termination determination unit 406c determines whether an elapsed period that has elapsed since the pump cell admittance Ap reached the hydrogen generation admittance Ah at the time t2 of FIG. 7 is greater than the necessary reduction duration that corresponds to the arrival time interval from the time t2 to time t3 shown in FIG. 7.

If the elapsed period that has elapsed since the pump cell admittance Ap reached the hydrogen generation admittance Ah at the time t2 of FIG. 7 is less than or equal to the necessary reduction duration (NO at step S108), the determination at step S108 is repeatedly executed.

Otherwise, if the elapsed period that has elapsed since the pump cell admittance Ap reached the hydrogen generation admittance Ah at the time t2 of FIG. 7 is greater than the necessary reduction duration (YES at step S108), the routine proceeds to step S109.

At step S109, the termination determination unit 406c determines whether to terminate the early activation control. Upon determining to terminate the early activation control, the voltage application unit 406a applies, to the pump cell, the normal voltage V1 lower than the removal voltage V2 as, for example, the AC voltage ΔVp.

Figure 9:
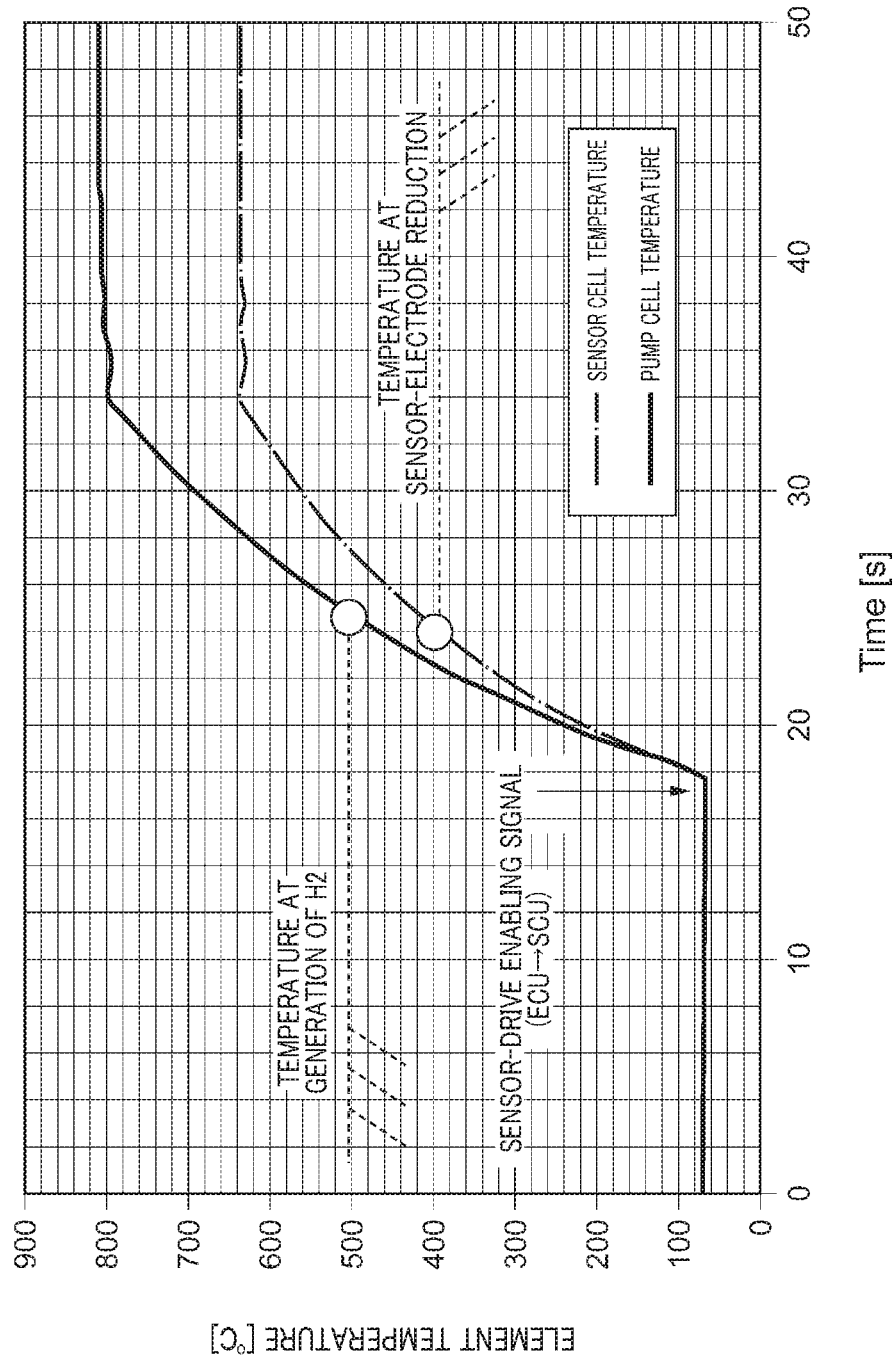
FIG. 9 is a graph used for describing the routine performed by the SCU of FIG. 1.

FIG. 9 shows one example of the correlation between the temperature of the sensor cell and the temperature of the pump cell. In this example shown in FIG. 9, a hydrogen generation time when the temperature of the pump cell has arrived at the threshold temperature at which the pump cell starts to generate hydrogen is later than a reduction time when the temperature of the sensor cell has arrived at a reduction temperature at which the sensor cell starts to reduce the NOx. In this case, as described above, it is preferred that the early activation control is performed while monitoring the temperature of the pump cell.

If the reduction time when the temperature of the sensor cell has reached the reduction temperature at which the sensor cell starts to reduce the NOx is later than the hydrogen generation time when the pump cell reaches the threshold temperature at which the pump cell is capable of generating hydrogen, it is preferred that the early activation control is performed while monitoring the temperature of the sensor cell. Preferably, the respective temperatures of both the pump cell and the sensor cell are monitored, because the respective temperatures of both the pump and sensor cells can be acquired regardless of the correlation described above.

Figure 10:
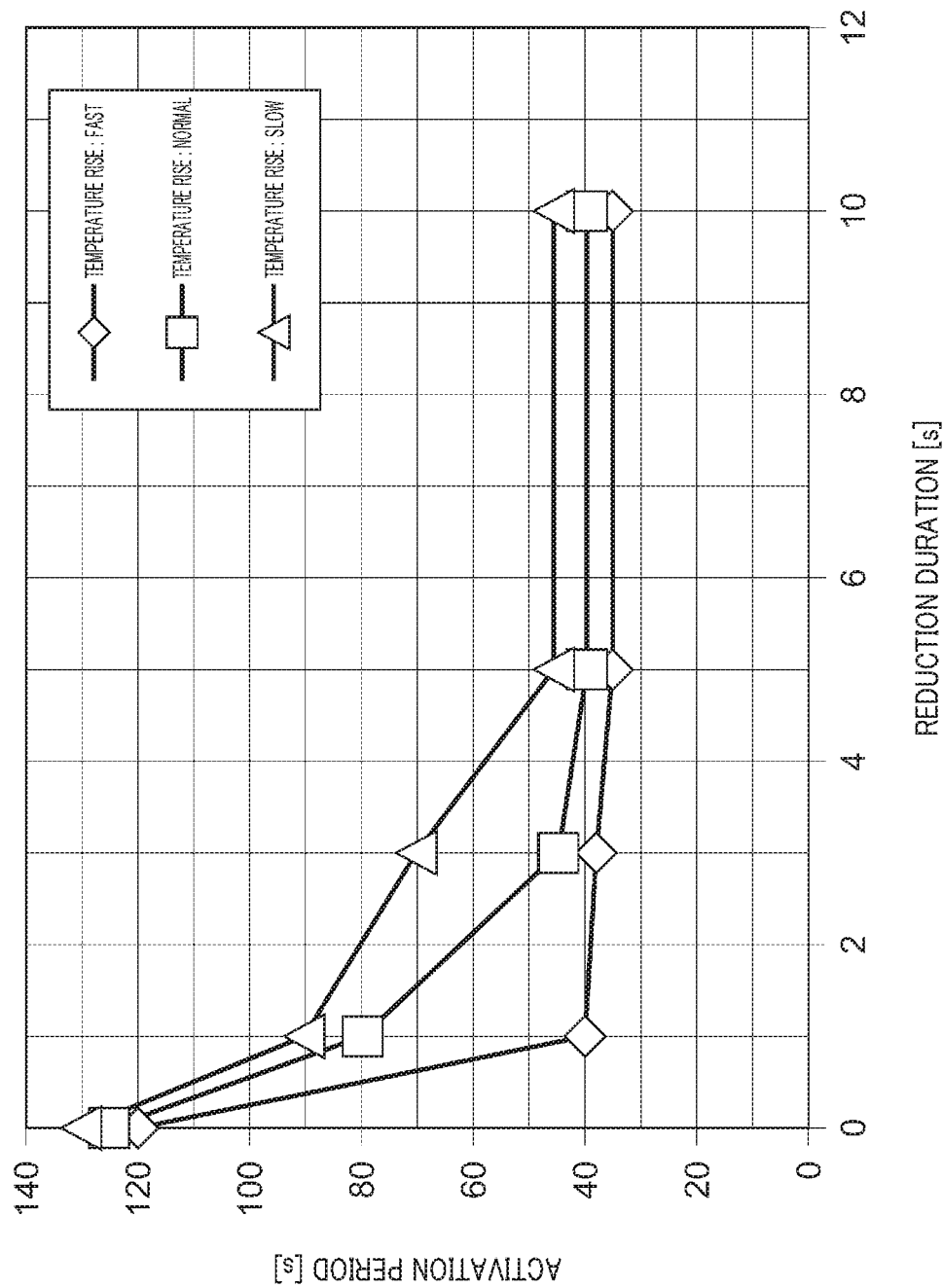
FIG. 10 is a graph used for describing the routine performed by the SCU of FIG. 1.

FIG. 10 illustrates the relationship between the reduction duration and an activation period. FIG. 10 illustrations an example of comparison among 1. A first example where a first time interval that has elapsed from the start of driving the NOx sensor until the pump cell admittance Ap reaches the hydrogen generation admittance Ah 2. A second example where a second time interval that has elapsed from the start of driving the NOx sensor until the pump cell admittance Ap reaches the hydrogen generation admittance Ah 3. A third example where a third time interval that has elapsed from the start of driving the NOx sensor until the pump cell admittance Ap reaches the hydrogen generation admittance Ah The third time interval is longer than both the first and second time intervals, and the second time interval is longer than the first time interval.

Figure 11:
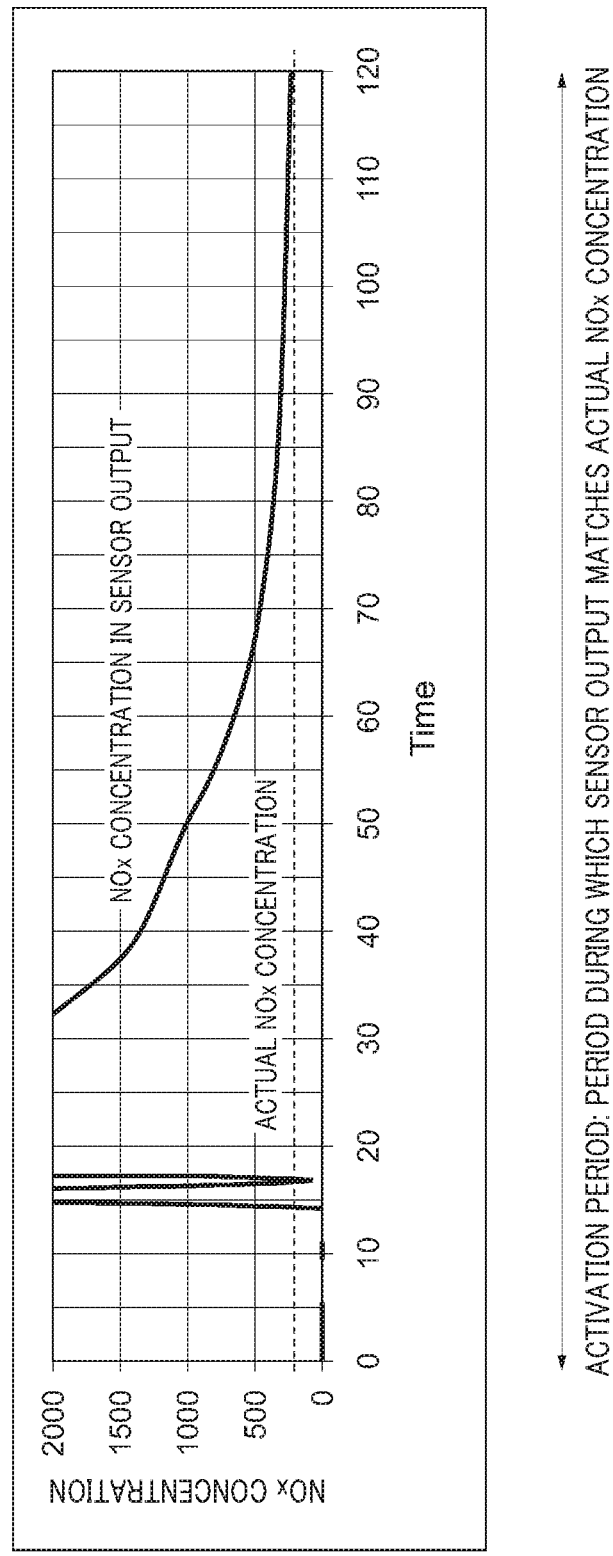
FIG. 11 is a graph used for describing the routine performed by the SCU of FIG. 1.

As shown in FIG. 11, the activation period represents the length of time required for the output of the NOx sensor and an actual NOx concentration to have the same value.

When the time interval that has elapsed until the temperature of the pump cell reaches the hydrogen generation temperature is less than 10 seconds, it is determined that the time that has elapsed from the start of driving the NOx sensor until the pump cell admittance Ap reaches the hydrogen generation admittance Ah is short. When the time that has elapsed until the temperature of the pump cell reaches the hydrogen generation temperature is 10 seconds or more and less than 20 seconds, it is determined that the time interval that has elapsed from the start of driving the NOx sensor until the pump cell admittance Ap reaches the hydrogen generation admittance Ah is normal. When the time interval that has elapsed until the temperature of the pump cell reaches the hydrogen generation temperature is 20 seconds or more, it is determined that the time interval that has elapsed from the start of sensor drive until the pump cell admittance Ap reaches the hydrogen generation admittance Ah is long.

When the time interval that has elapsed from the start of driving the NOx sensor until the pump cell admittance Ap reaches the hydrogen generation admittance Ah is short, it is preferred that the reduction period is set to 1 second or more. When the time interval that has elapsed from the start of sensor drive until the pump cell admittance Ap reaches the hydrogen generation admittance Ah is long, 5 seconds or more is sufficient for the reduction period. It is also preferred that the reduction period is ensured in accordance with the rate of increase in the temperature of the NOx sensor based on the relationship illustrated in FIG. 7.

Figure 12:
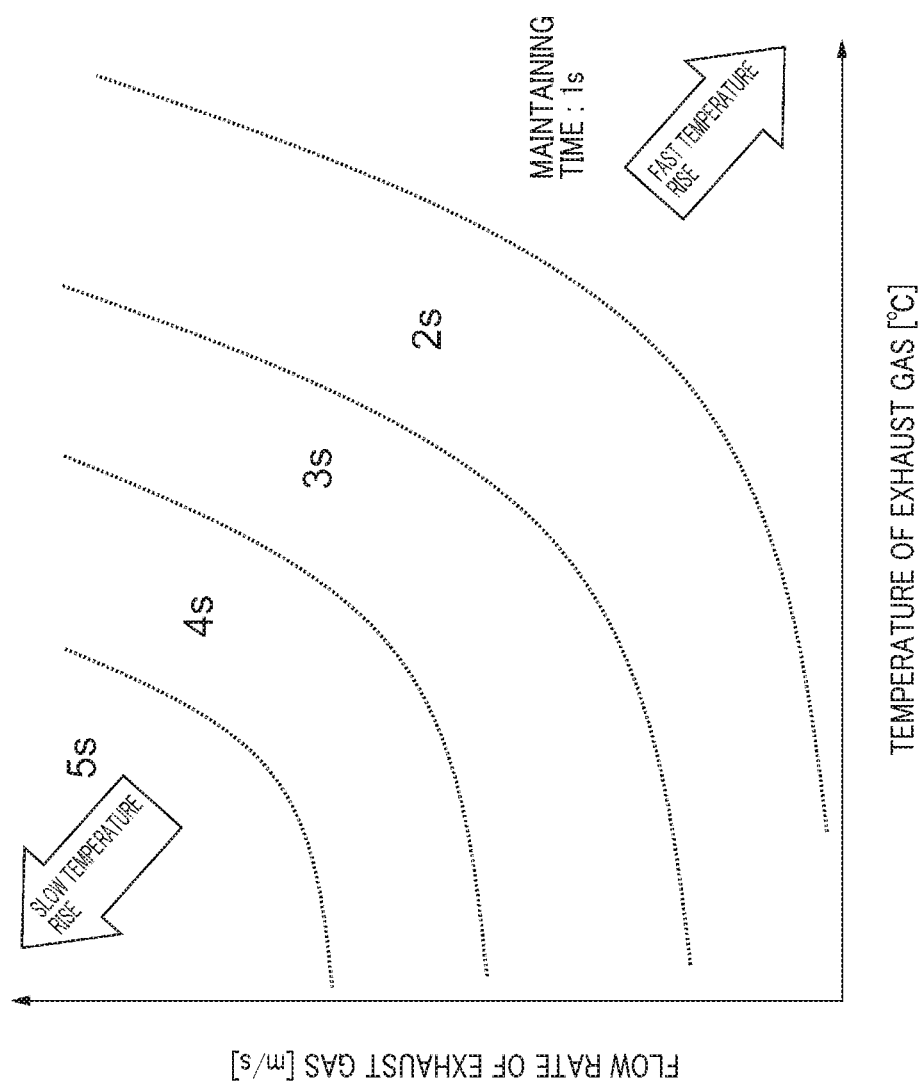
FIG. 12 is a graph used for describing the routine performed by the SCU of FIG. 1.

FIG. 12 illustrates one example of the relationship between the temperature and flow rate of the exhaust gas.

When the temperature of the exhaust gas is low and the flow rate of the exhaust gas is high, the temperature rise in the pump cell becomes slow, requiring the reduction period to be relatively long. When the temperature of the exhaust gas is high and the flow rate of the exhaust gas is low, the temperature rise in the pump cell becomes fast, requiring the reduction period to be relatively short.

Figure 13:
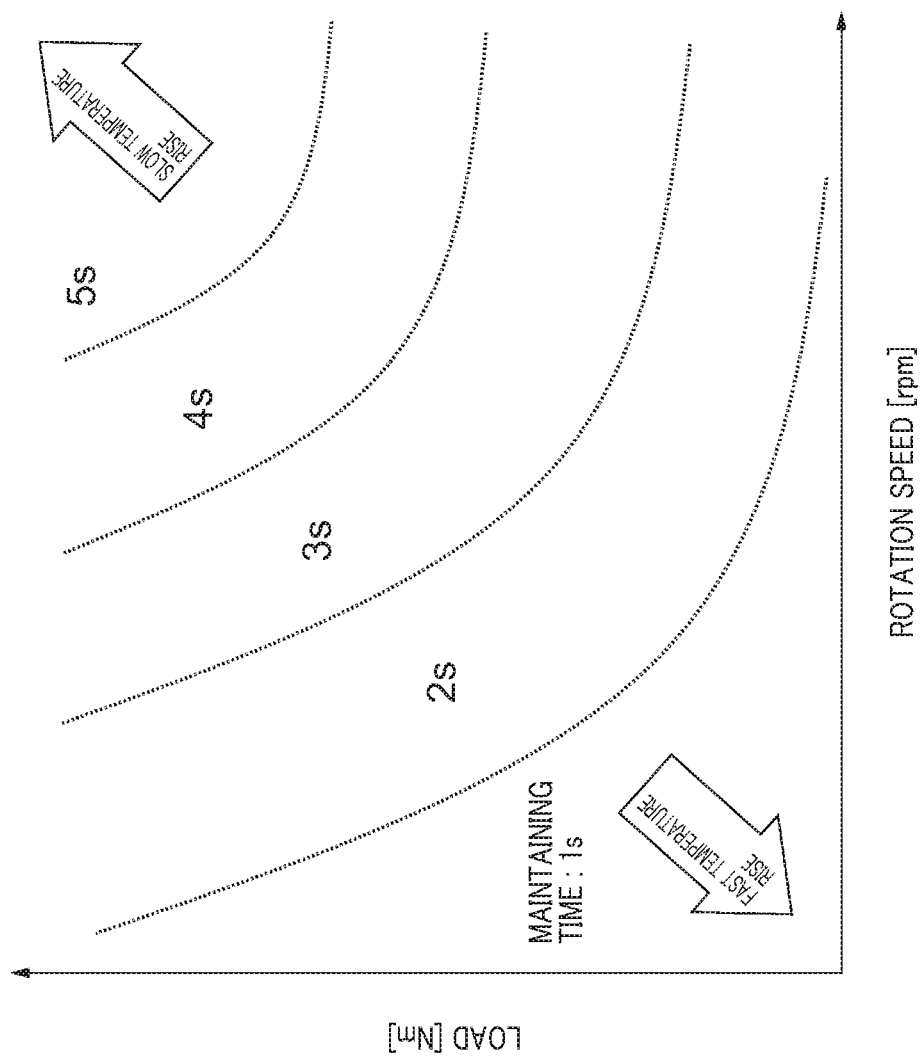
FIG. 13 is a graph used for describing the routine performed by the SCU of FIG. 1.

FIG. 13 illustrates one example of the relationship between at least one load on the internal combustion engine and the rotational speed thereof. When the rotational speed of the internal combustion engine is low and the load thereon is low, the temperature rise in the pump cell becomes fast, requiring the reduction period to be relatively short. When the rotational speed of the internal combustion engine is high and the load thereon is high, the temperature rise in the pump cell slow, requiring the reduction period to be relatively long.

The present embodiments have been described with reference to the specific examples. However, the present disclosure is not limited to these examples. Appropriate modifications may be made to the specific examples as would be obvious to a person skilled in the art without departing from the scope of the present disclosure, as long as the modified examples include the features of the present disclosure. Appropriate modifications may be made to the components of the specific examples and the arrangements, conditions, and shapes thereof. Appropriate changes may be made to the combination of the components of the specific examples unless a technical inconsistency arises therefrom.

What is claimed is:

1. A control apparatus for an exhaust gas sensor, comprising:
   a voltage application unit that selectively applies a normal voltage and a removal voltage higher than the normal voltage to a first cell that constitutes the exhaust gas sensor, the first cell being configured to remove, based on the removal voltage, oxygen in an exhaust gas from an internal combustion engine;
   an element temperature measurement unit that measures an element temperature parameter indicative of a temperature of the first cell; and
   a termination determination unit that determines, based on the element temperature parameter, a termination time of terminating the application of the removal voltage to the first cell by the voltage application unit, wherein
   the termination determination unit is configured to determine that it is the termination time of the terminating the application of the removal voltage upon a predetermined threshold period having elapsed since the element temperature parameter reached a value indicative of a predetermined threshold temperature.

2. The control apparatus according to claim 1, wherein the element temperature parameter indicates a temperature of the first cell, and is an admittance or an impedance of the first cell during an application of an alternating voltage to the first cell.

3. The control apparatus according to claim 1, wherein:
the element temperature parameter indicates a temperature of a second cell of the exhaust gas sensor, the second cell being configured to detect a measurement target component contained in a measurement target gas from which the oxygen has been removed by the first cell, and
the element temperature parameter is an admittance or an impedance of the second cell during application of an alternating voltage to the first cell.

4. The control apparatus according to claim 1, wherein the element temperature parameter indicates a temperature of each of the first cell and a second cell that detects a measurement target component contained in a measurement target gas from which the oxygen has been removed by the first cell, and
the element temperature parameter is an admittance or an impedance of each of the first cell and the second cell during an application of an alternating voltage to the first cell.

5. The control apparatus according to claim 1, wherein the first cell and a second cell of the exhaust gas sensor are both disposed in a measurement chamber.

6. The control apparatus according to claim 1, wherein the termination determination unit is configured to adjust the predetermined threshold period based on an elapsed period that has elapsed from a first time at which the voltage application unit starts to apply the removal voltage to the first cell to a second time at which the element temperature parameter has arrived at the value indicative of the predetermined temperature threshold.

7. The control apparatus according to claim 6, wherein the termination determination unit is configured to adjust the predetermined threshold period such that the longer the elapsed period, the longer the predetermined threshold period.

8. The control apparatus according to claim 1, further comprising:
an environmental information acquisition unit configured to acquire, from another control apparatus, at least one of
environmental condition information on an environmental condition including at least one of a flow rate of the exhaust gas and a temperature of the exhaust gas in a predetermined arrangement position of the exhaust gas sensor, and
operating condition information on an operating condition of the internal combustion engine,
wherein the termination determination unit is configured to adjust the predetermined threshold period based on at least one of the environmental condition information and the operating condition information.

9. The control apparatus according to claim 8, wherein:
the termination determination unit is configured to adjust, based on the environmental condition information, the predetermined threshold period such that the higher the flow rate of the exhaust gas and the lower the temperature of the exhaust gas in a predetermined arrangement position of the exhaust gas sensor, the longer the predetermined threshold period.

10. The control apparatus according to claim 8, wherein:
the termination determination unit is configured to adjust, based on the operating condition information, the predetermined threshold period such that the higher at least one load on the internal combustion engine and the higher a rotational speed of the internal combustion engine, the longer the predetermined necessary duration.

* * * * *